United States Patent
Chiang et al.

(10) Patent No.: US 9,554,094 B1
(45) Date of Patent: Jan. 24, 2017

(54) SYSTEM AND METHOD FOR DETERMINING A DISPLACED SUBSTRATE WITH A VISION SYSTEM

(71) Applicant: Cognex Corporation, Natick, MA (US)

(72) Inventors: Gilbert Chiang, Natick, MA (US); Robert Tremblay, Grafton, MA (US)

(73) Assignee: Cognex Corporation, Natick, MA (US)

( * ) Notice: Subject to any disclaimer, the term of this patent is extended or adjusted under 35 U.S.C. 154(b) by 449 days.

(21) Appl. No.: 13/796,726

(22) Filed: Mar. 12, 2013

Related U.S. Application Data

(60) Provisional application No. 61/731,984, filed on Nov. 30, 2012.

(51) Int. Cl.
*H04N 7/18* (2006.01)

(52) U.S. Cl.
CPC ........................ *H04N 7/18* (2013.01)

(58) Field of Classification Search
None
See application file for complete search history.

(56) References Cited

U.S. PATENT DOCUMENTS

| | | | |
|---|---|---|---|
| 4,105,925 A | 8/1978 | Rossol et al. | |
| 5,212,738 A * | 5/1993 | Chande et al. | 382/152 |
| 5,669,871 A * | 9/1997 | Sakiyama | 600/117 |
| 5,956,134 A * | 9/1999 | Roy et al. | 356/237.5 |
| 6,122,001 A | 9/2000 | Micaletti et al. | |
| 6,369,401 B1 | 4/2002 | Lee | |
| 6,501,554 B1 | 12/2002 | Hackney et al. | |
| 6,522,777 B1 | 2/2003 | Paulsen et al. | |
| 6,574,580 B2 | 6/2003 | Hamilton | |
| 6,603,103 B1 | 8/2003 | Ulrich et al. | |
| 6,688,979 B2 * | 2/2004 | Soltys et al. | 463/25 |
| 7,349,567 B2 | 3/2008 | Leonard et al. | |
| 7,404,861 B2 * | 7/2008 | Prentice et al. | 118/713 |
| 7,773,209 B2 | 8/2010 | Hackney et al. | |
| 7,864,178 B2 | 1/2011 | Marini et al. | |
| 8,237,788 B2 * | 8/2012 | Cooper et al. | 348/86 |
| 2002/0038794 A1 | 4/2002 | Canella et al. | |
| 2002/0078580 A1 * | 6/2002 | Haugen et al. | 33/533 |
| 2007/0146696 A1 * | 6/2007 | Noguchi et al. | 356/237.5 |
| 2007/0189597 A1 | 8/2007 | Limer et al. | |
| 2009/0128647 A1 * | 5/2009 | Fahn et al. | 348/221.1 |
| 2010/0020167 A1 * | 1/2010 | Zandifar et al. | 348/87 |
| 2010/0188417 A1 * | 7/2010 | Kojitani et al. | 345/593 |

(Continued)

*Primary Examiner* — Reza Aghevli
(74) *Attorney, Agent, or Firm* — Loginov & Associates

(57) ABSTRACT

A system and method for detecting and/or determining the existence of displacement of a substrate with respect to a surrounding object uses a laser line that is free of contact with the object and that is received by an image sensor. A processor reads the line information in a series of image frames, and generates a range image with height information. The height information is provided to a 2D map. Differences between adjacent height measurements, and averages, are computed. Vision system tools are used to accurately locate features in the image and these are aligned with the height information. The height differences are interpreted, with missing height data due, for example, to specularity in the image being approximated. The height differences are compared to predetermined height parameters relative to identified locations, for example, wells, in the object to determine whether a substrate is displaced.

17 Claims, 4 Drawing Sheets

(56) References Cited

U.S. PATENT DOCUMENTS

2010/0198322 A1* 8/2010 Joseph et al. .................. 607/108
2010/0208275 A1* 8/2010 Babayoff ....................... 356/610
2011/0080477 A1* 4/2011 Trenary et al. ............... 348/135
2011/0169917 A1* 7/2011 Stephen et al. ................. 348/46
2011/0193953 A1* 8/2011 Sones et al. .................. 348/135

* cited by examiner

SYSTEM AND METHOD FOR DETERMINING A DISPLACED SUBSTRATE WITH A VISION SYSTEM

RELATED APPLICATIONS

This application claims the benefit of U.S. Provisional Application Ser. No. 61/731,984, filed Nov. 30, 2012, entitled SYSTEM AND METHOD FOR DETERMINING A DISPLACED SUBSTRATE WITH A VISION SYSTEM, the entire disclosure of which is herein incorporated by reference.

FIELD OF THE INVENTION

This invention relates to machine vision systems and more particularly to machine vision systems for use in monitoring objects in a production line.

BACKGROUND OF THE INVENTION

In various manufacturing processes objects are moved from one production phase to another, often along a moving production line conveyor. In many processes, such as electronic circuit fabrication, the object-under-manufacture is carried by a "tray" or other carrier, into which the object, or "substrate", is seated. This tray serves to align the object and provide a base that allows manufacturing processes to be administered to the object. Often the tray includes a well with clamping structures that maintain the substrate securely on-level within the well. By way of example, an object in a tray can move along a production line from a high-pressure wash station to a finishing station.

In the example of processing substrates in carrying trays, it is possible for one production process to cause the substrate to become displaced in the tray (e.g. the pressure of the wash cycle forces one or more or the substrate corners out of the tray's clamping arrangement). This condition can be defined as a "substrate-out-of-pocket", or "SOOP". If a substrate becomes displaced, any subsequent processing steps will be inapplicable, as proper alignment of the substrate within the tray is generally required for the substrate to be properly processed. Thus, identifying substrates that are "out of pocket" is highly desirable.

An out-of-pocket substrate is often challenging to detect through conventional techniques. In many instances, the substrate must remain free of contact, and thus metrologies that directly measure to substrate surface may be unavailable. Techniques that employ visible or near-visible (e.g. IR) light are available where contact is to be avoided. One possible technique is the use of edge and/or feature finding with a machine vision system. However, when the substrate is potentially still aligned with the edges of the well, but no longer level within the well, machine vision edge-finding techniques may fail to determine the displacement of the substrate as they operate on a two dimensional image of a scene.

A variety of other light-based processes can be employed to accurately determine if a substrate (or other object) is displaced with respect to its surroundings. For example a plurality of laser displacement sensors can be arrayed over the inspection area. However this is an expensive solution, requiring a large array of sensors to accurately determine the substrate's orientation. This is because each sensor provides only a single-point absolute measurement. In addition, such a sensor arrangement would be subject to positioning errors and the mechanical tolerances of the surrounding tray.

Another possible technique is to employ laser profiling, where the substrate is moved through a laser line while a measurement of the profile is made. However, this technique is generally too slow when attempting to provide the required accuracy for determining displacement of the substrate. Yet another possible technique is to arrange a light curtain in the path of the substrate. However, light curtains are subject to tolerance errors in tray and/or variability in the conveyance system (e.g. variation in the height of the conveyor as it moves through the fixed-height curtain. Likewise, this approach only provides absolute measurements.

All of the non-contacting, light-based detection techniques described above are more particularly subject to error due to the high level of specular reflection from the substrate and/or surrounding tray (or other object), which causes certain regions of scene to provide unexpected results that can skew the analysis of the object.

SUMMARY OF THE INVENTION

This invention overcomes disadvantages of the prior art by providing a system and method for detecting and/or determining the existence of (and degree of) displacement of a substrate with respect to a surrounding object. This system and method uses a laser line that is free of contact with the object and that is received by an image sensor, which is operatively connected with a vision system processor. The vision system processor reads the line information in a series of image frames (slices) of the object and generates corresponding intensity images in which each intensity image is based upon height displacement of segments. The discrete, acquired intensity images are used to respectively provide the discrete rows of pixels in a range image with height information that defines a height profile of the imaged object. In an embodiment, the height profile is defined as a series of levels corresponding to shades of a 16-bit grey scale image. The height information is provided to a two-dimensional (2D) map and small differences between adjacent height measurements are computed. Average heights are provided to define a series of planar surfaces in the image. Vision system tools are used to accurately locate features in the image and these are aligned with the height information. The height differences are interpreted, with missing height data due (for example) to specularity in the image being approximated. The height differences are compared to predetermined height parameters relative to identified locations (e.g. wells) in the object to determine whether a substrate is displaced. Results indicating any displaced substrates are reported for the object.

In an illustrative embodiment, a system and method for determining displacement of a substrate with respect to a surrounding object is based upon a vision system that projects a laser line along the image. This system receives reflected light from the laser line to generate a range image having height information with respect to the object and substrate. A mapping process generates a 2-dimensional (2D) map from the height information in the range image. A displacement determination process then compares the height information to predetermined parameters to determine whether a displaced substrate is present. The range image is illustratively generated from an intensity image in which intensity values respectively correspond to predetermined ranges of height on the object. A positioning process can be provided, using at least one vision system tool to locate object features. These tools can include, illustratively, edge-finding tools, corner-finding tools, and the like, that search for well edges and/or corners, tray edges and/or corners, substrate edges and/or corners, etc. The displacement determination process can also include an interpretation process that generates height information for portions of the map that omit accurate height information. These portions can be the result of specularity or other obscuring factors with respect to the object. Illustratively, the mapping process is constructed and arranged to compute and average height information for pixel locations based upon pixel values of adjacent pixel locations in the map. These averaged regions can define planar surfaces.

In an embodiment, the object can define a carrier tray and the substrate is located within a well in the carrier tray. The carrier tray (or other object containing substrates that can be out-of-pocket) illustratively moves along a conveying surface with respect to the projected laser line and is scanned during such relative motion by the vision system. The vision system can receive, with respect to the conveying surface, a motion signal that controls acquisition of image frames used to generate the range image. This motion signal can be generated by an encoder or other motion tracking mechanism. Additionally, a registration process can be used to locate at least one fiducial on the carrier tray and that thereby locates an expected position of the well. By way of example, the substrate can define a semiconductor substrate.

BRIEF DESCRIPTION OF THE DRAWINGS

The invention description below refers to the accompanying drawings, of which.

DETAILED DESCRIPTION

Figure 1:
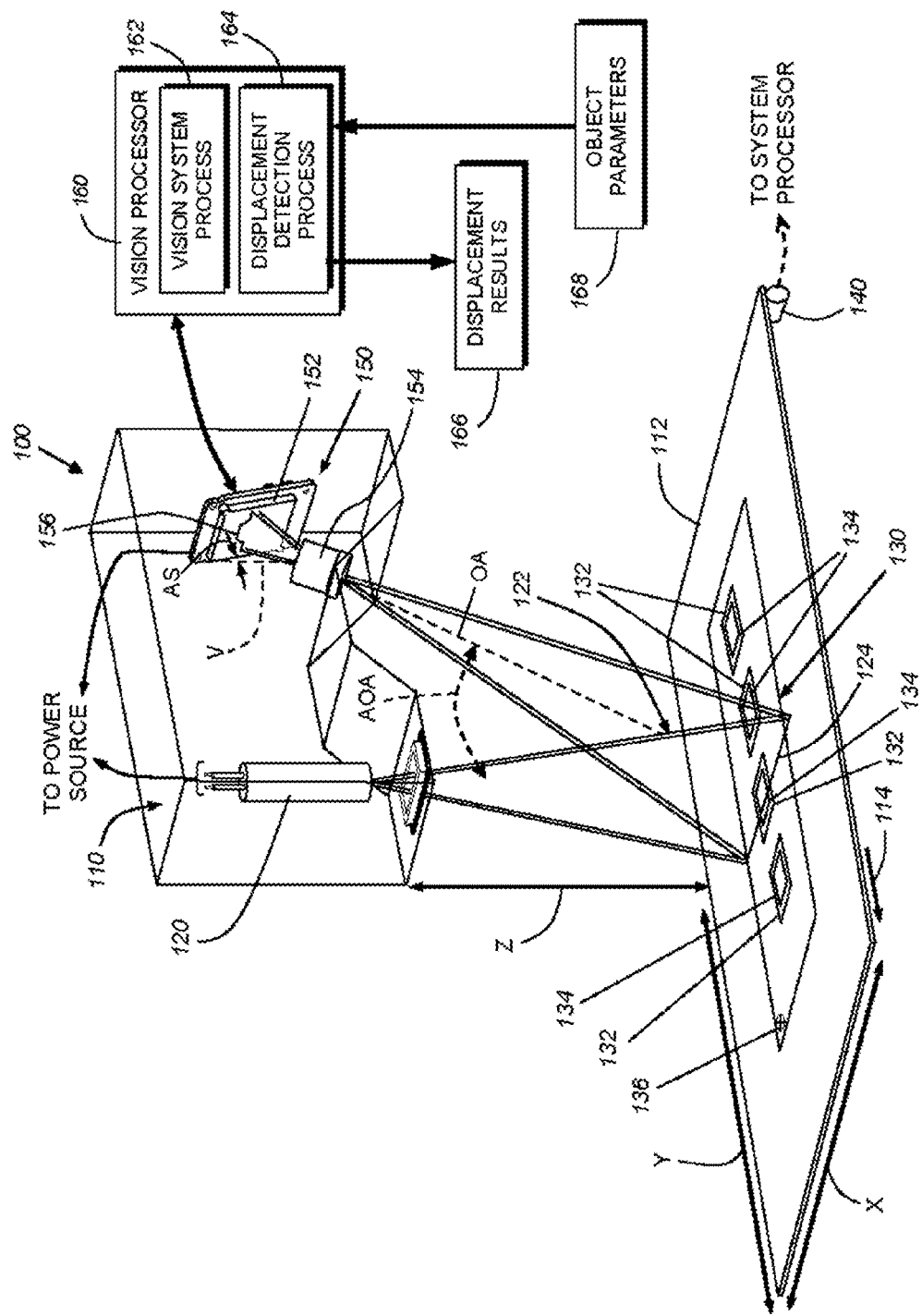
FIG. 1 is an exposed perspective view of a displacement detection/determination system employing a laser projecting a line onto a scene containing an object with substrate and an image sensor having an image plane oriented at a non-perpendicular angle with respect to a plane of the scene, according to an illustrative embodiment.

FIG. 1 depicts a system 100 for detecting and/or determining a substrate-out-of-pocket condition according to an illustrative embodiment. The system includes a housing assembly 110 that can be implemented as one or more discrete units. The housing assembly 110 is suspended at a predetermined height along the vertical z-axis (which is generally perpendicular with respect to a conveying surface 112). The conveying surface defines a width along the x-axis and moves (arrow 114) with respect to the upstream-to-downstream-oriented y-axis. Note that the arrangement of axes is a convention and other representations of relative orientation (e.g. polar coordinates) are expressly contemplated. More generally, as used herein various directional and orientational terms such as "vertical", "horizontal", "up", "down", "bottom", "top", "side", "front", "rear", "left", "right", and the like, are used only as relative conventions and not as absolute orientations with respect to a fixed coordinate system, such as gravity.

In this embodiment, the housing assembly includes laser assembly 120 that employs conventional optics to project a diverging (e.g. a fan 122) line 124 onto the plane of the conveying surface 112. The width of the line 122 where it meets the surface 112 is at least as wide as the region of interest being inspected by the system. In this example, the region of interest includes an exemplary tray 130 having associated wells 132 that contain respective substrates 134. The precise shape and number of wells and associated substrates is highly variable. In further example, a plurality of side-by-side (along the x-direction) wells and substrates can be provided. The geometry of the tray can also vary in further examples, with various other recesses and/or non-planar features residing between wells. At least one region of the tray 130 (e.g. a corner) can include a fiducial, notch or other structure/pattern 136 that is readily identified by vision system processes. This can assist in registering the location of the tray with respect to the imaged scene and the system 110. As described below, the system includes stored parameters that (168 below) that provide the dimensions of the tray (or other object) so that the system searches for wells/substrates in the appropriate locations. In alternate embodiments, the system can include tools that find and recognize edges and other features associated with a well/substrate.

An encoder assembly, or other motion tracking device, 140 can provide movement signals with respect to conveyor motion to the system 110 via an appropriate interface or other output device. These movement signals (e.g. pulses) can allow the system to determine relative speed and position of the tray with respect to the system's field of view, and also determine when to trigger image acquisition. Conventional part detectors, and the like, can also be employed to trigger image acquisition. The encoder signal interacts, via the interface to an appropriate functionality the vision system's processor arrangement, which includes the vision system processing components (160), and any related processing functions and/or devices, such as those providing auto-regulation functions, trigger controls, illumination control, etc.

The function of image acquisition is performed by an image sensor assembly (also termed an "imager") 150, which can be based upon a CMOS-type circuit architecture, or another appropriate type (e.g. CCD). The sensor assembly 150 includes a 2-dimensional (2D) image sensor 152. The sensor 152 defines an image plane that is oriented at an acute angle AS with respect to the vertical axis (z-axis). The sensor receives light from the scene through an imaging lens 154 of appropriate size, shape, aperture and magnification. The optical axis OA of the lens 154 is oriented at an acute angle AOA with respect to the vertical (dashed line V). The angle AS and angle AOA can each vary, and are adapted to project the line 156 as variably broken across the width image plane based upon respective variation in the height of the imaged scene as shown.

As the object (tray 130 with substrates 134) moves with respect to the field of view, the system stores a series of image frames (slices) containing variations in the line location. These frames are processed by a vision processor 160 that can reside within the housing (for example as a separate interconnected circuit board or as part of the sensor assembly 150, itself). The vision processor can alternatively reside in whole, or in part, on a remote computer interconnected by an appropriate wired and/or wireless link. The vision processor 160 operates a vision system process 162 that performs a variety of vision system tasks using associated tools, such as edge-finding, blob analysis, etc. As described below, such tools can be used to locate (for example) substrates 134 with respect to the wells 132 of trays 130, and handle portions of the image that exhibit specularity.

In an illustrative embodiment, the vision processor 160 also operates a displacement detection (and/or determination) process 164 that analyzes image data stored with respect to objects and determines (for example) whether a located substrate 134 is out-of-pocket with respect to the well 132 of its surrounding carrier tray 130. Various object parameters 168 can be provided to the process 164 to enable it to distinguish between a properly seated and displaced substrate. The process 164 generates displacement results 166 indicating whether or not a substrate is displaced, and optionally, the degree of displacement. These results can be used to signal a visible and/or audible alarm operatively connected to the housing. A remote computer, server, or other data-storage and handling system (not shown) can also receive results over an appropriate link, such as a network Ethernet cable. The operation of the displacement detection process 164 is described further below.

Note, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor here herein can be implemented using electronic hardware, software consisting of a non-transitory computer-readable medium of program instructions, or a combination of hardware and software.

Figure 1A:
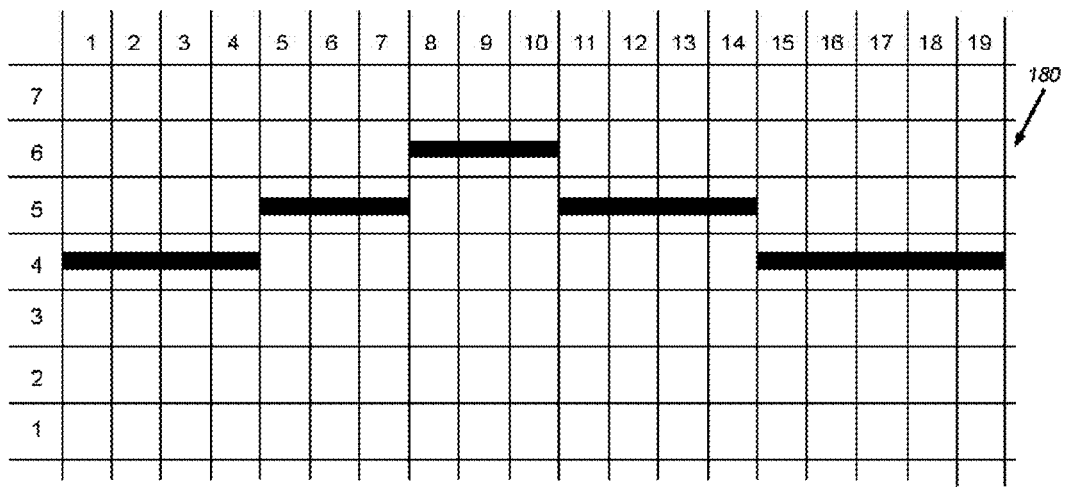
FIG. 1A is a diagram showing a portion of an exemplary image sensor pixel array onto which a variably broken laser line from an imaged object has been projected.
Figure 1B:
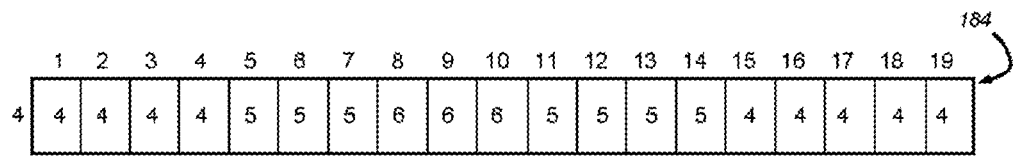
FIG. 1B is a diagram showing an exemplary pixel row derived from the image on the sensor of FIG. 1A, which comprises an intensity image.
Figure 1C:
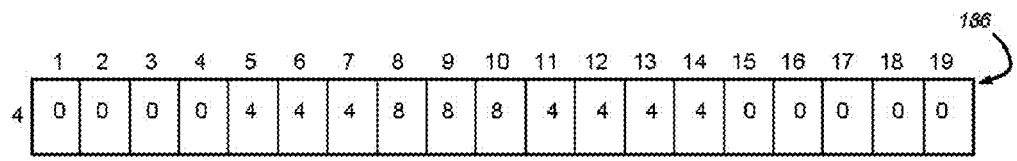
FIG. 1C is a diagram showing the exemplary intensity image pixel row of FIG. 1B with normalized column values so as to derive a row of a range image therefrom.

The vision system process(es) 162 of the processor 160 include procedures for generating a grayscale intensity image from a set of line images (slices) of the object as it moves relative to the field of view. The encoder can regulate when images are acquired, ensuring that neither too many nor too few slices are acquired to provide an appropriate image. As each image slice is acquired, the projected line varies in height (on the image sensor) based on the associated height of the imaged object. Thus, at each column, the line appears in higher and lower pixel rows corresponding to the associated object height. The pixel locations for the line at each pixel column of the image sensor are stored as a single pixel row and the height differentials are normalized into pixel intensity values in that row. This row becomes a single row in an overall image that is termed a "range image". As shown by way of example in FIG. 1A, a portion of an image sensor pixel array 180 is depicted. Rows have been arbitrarily numbered 1-7 and columns have been arbitrarily numbered 1-19. When the process analyzes the image, it searches for peak intensity regions, representing locations of the line. In this example, the imaged line resides in rows 4, 5 and 6. In practice, the line can reside over a plurality of rows, but for simplicity, each segment of the line is shown fully imaged within a single pixel row. The various height (row) locations are then assigned to a single row 184, as shown in FIG. 1B. Each of these rows thereby defines a discrete, acquired intensity image. The values in each intensity image can be normalized into a predetermined number of gray levels (for example, a 16-bit gray scale intensity value corresponding to a discrete, associated height measurement), thus defining a range image. This range image includes pixel array rows defined from each respective intensity image, such as row 186 in FIG. 1C. These levels can be translated into specific height values (e.g. in millimeters).

Figure 2:
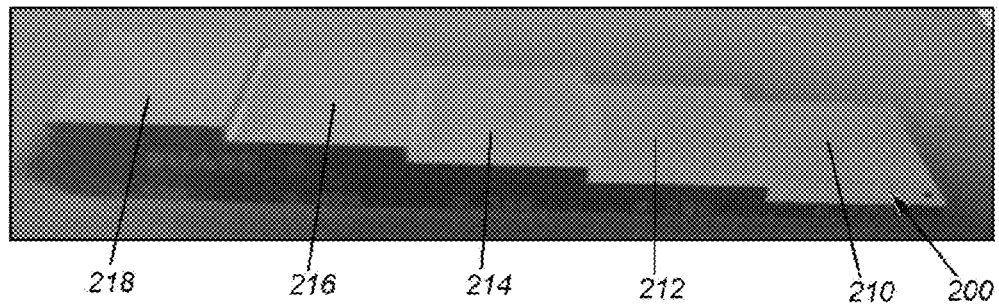
FIG. 2 is a perspective view of an exemplary object having a plurality of stepped elevations that can be imaged by the system of FIG. 1.
Figure 3:
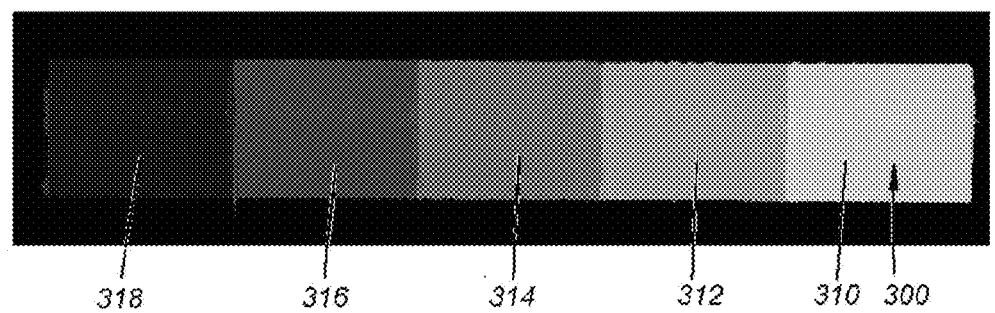
FIG. 3 is a display image of a plurality of gray scale sections generated by the system and corresponding to each of the respective step elevations of FIG. 2.

By way of further example, an object 200 is depicted in FIG. 2, which defines five stepped surfaces 210, 212, 214, 216 and 218, each of increased elevation. Based upon the techniques described above, a range image 300 can be generated with associated intensity levels 310, 312, 314, 316 and 318 corresponding to a given surface height. The process can include algorithms that compensate for perspective, as closer regions of an image typically appear larger than more-distant regions. As described above, these intensities can be normalized into a predetermined number of steps (e.g. 0-15). The number of steps is highly variable. An implementation of this technique is provided in the Profile-Plus™ system available from Cognex Corporation of Natick, Mass. However a wide range of alternate implementations that generate such a range image can be employed in accordance with ordinary skill.

Figure 4:
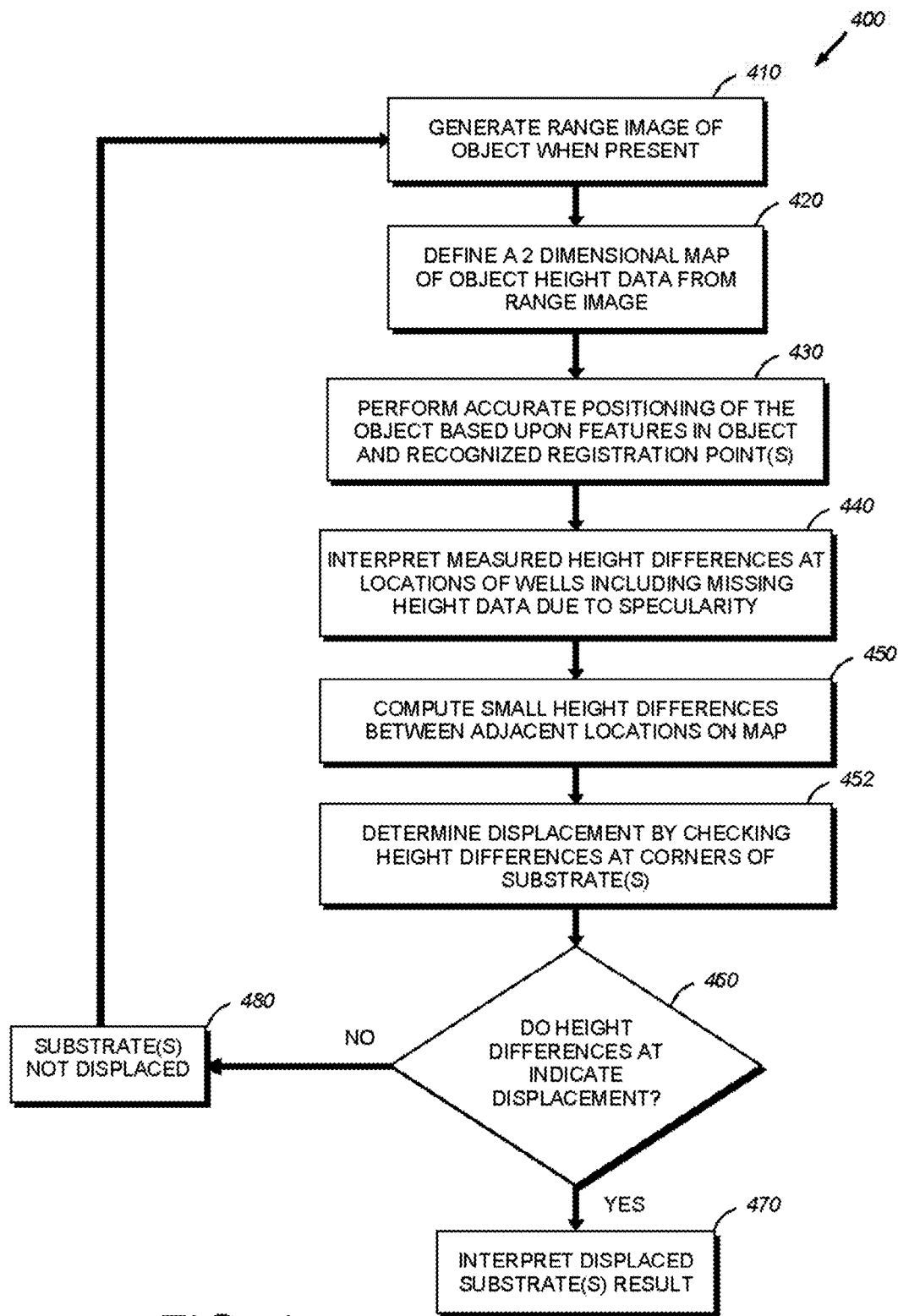
FIG. 4 is a flow diagram showing a procedure for detecting and determining displacement of a substrate within a surrounding object, such as a tray carrier.

Having described an illustrative system and process for scanning an object containing a substrate, reference is now made to FIG. 4 which further describes an illustrative procedure 400 for determining displacement of the substrate within a surrounding object, such as a carrier tray. In step 410, each tray (object) passes through the systems field of view and is scanned as described above. The scanning is performed in synchronization with the encoder so that an image generated by the system is appropriately sized and scaled with minimal distortion. Such distortion can occur due to variation in conveyor speed as the object passes through the field of view, and tracking of the relative speed allows the system to compensate for such variations. In this image generation process, the system generates a range image with appropriate height information. This range image then allows the generation of a 2-dimensional (2D) map of height data in a mapping process (step 420).

In step 430, the procedure 400 then addresses any potential positional inaccuracies as a result of variations in tray motion through the field of view by locating features on the tray (such as the edges of wells, etc.). The procedure uses conventional edge-finding and other appropriate vision system tools to perform this step. The procedure 400 can base the finding of features on the registered position of the tray (based upon one or more recognizable fiducial(s) (136). With knowledge of the tray's relative position in the image, the features are then accurately located by searching for them in their approximate expected location(s). These expected locations are based upon the stored parameters related to the tray's geometry. In this positioning process, the height information in the image can be adjusted or updated based upon the found locations for features. For example, if a well is found, the height information in the image can be realigned so that a measured change in height occurs around the well's edge.

In step 440, the procedure 400 then interprets the measured height in the image in (at least) regions that contain wells (or equivalent structures for receiving substrates). In performing the interpretation process, the procedure 400 attempts to fill in any missing height data that was omitted from the image due (for example) to specularity. That is, a reflection in a portion of the image during the scanning process caused a failure to properly read that portion's height. The in-filling of missing height information can be based upon averaging the height data from the areas surrounding the portion with missing height. If there is a height transition between surrounding portions, the missing portion can be provided with a smooth transition from one height to the other. If the missing region appears to be along an edge or corner (for example, a break in a continuous edge) then the procedure can provide a similar transition to the missing portion. More generally, a conventional outlier-elimination algorithm can be applied to assist in interpreting missing height data.

Using this map, in step 450, the procedure 400 then computes small height differences between adjacent locations on the map (and associated tray/substrate), and averages pixel values for locations based upon the computations of height differences. In this manner, the image can be defined as an array of planar surfaces composed of groupings of averaged pixels.

With all available height data provided, a determination process (step 452) checks the corners of a substrate (in the example of a square or rectangular substrate geometry) for relative height compared to each other and compared to the surrounding tray. This effectively accounts for circumstances in which the substrate is fully "popped out" of the well and may exhibit all corners at the same height, and in which substrate is partially popped out with two corners higher than the opposing two corners (i.e. angled relative to the flat tray surroundings). The determination of a displaced height can be based upon predetermined parameters that are based on the stored specifications of the tray and/or substrate(s). Alternatively, the determination of displacement can be based upon a comparison between a particular substrate with others in the same (or a different) tray.

When the procedure identifies a displaced substrate (decision step 460), it sends an appropriate result (step 470) to an output device. This result can be an audible and/or visible alarm on an output device connected to the system, itself (e.g. on the housing) 110. Alternatively, or additionally, the result can be sent to a data system, such as a networked server. The result can identify a specific well (or wells) with displaced substrates, or can more generally identify a tray (or trays) containing the displaced substrate(s). The results can be general, or specifically identify the height information, indicating whether the substrate is partially or fully popped out.

If the procedure 400 determines (decision step 460) that no substrate in a tray is displaced (step 480), then it can indicate such a result and/or can move on to image analyze the next substrate in step 410.

It should be clear that the system and method for determining displacement of substrates described herein provides an effective technique for accurately and quickly inspecting a variety of objects that move along a production line. This system and method desirably allows for inspection on the production line, free of the need to take objects offline or to stop the motion of such objects while images are acquired. Notably, the system and method allows for compensation for illumination and specularity variations within the ambient environment and provides its own reliable illumination source. The system and method can handle a variety of object widths and a wide range of object lengths due to the line-scan characteristics of its arrangement. In general, the system and method desirably detects displacement of an object with respect to a surrounding structure (e.g. a substrate within a tray), allowing for relatively fast and accurate determination of an out-of-pocket condition in a manner that is free of contact. This system and method operates effectively in the presence of specularity, and desirably allows for detection while the subject is in motion with respect to the detection arrangement, so as to enable implementation on a moving production line, typically free of line stoppage.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, the position of the object within the diverging fan of the laser line is highly variable, with closer, narrower objects typically providing higher accuracy than further, wider objects (e.g. a z-axis height range of 175 millimeters, with a width range between 50 and 132 millimeters). More generally, while a substrate in a tray is shown by way of example, the system and method herein can be applied to a wide range of objects containing substrates that may exhibit displacement—for example, circuit chips mounted on a printed circuit board. As such, the term "substrate" as used herein should be taken broadly to include a wide variety of structures that are received within a surrounding object and for which out-of-pocket conditions are to be determined. Accordingly, this description is meant to be taken only by way of example, and not to otherwise limit the scope of this invention.

What is claimed is:

1. A system for determining displacement of a substrate with respect to a surrounding object during movement of the object relative to a field of view, the system comprising:
    a laser line assembly that projects a laser line along the substrate, and
    an image sensor that receives reflected light from the laser line to generate a range image having height information with respect to the object and the substrate within the field of view;
    a 2-dimensional (2D) map generated from the height information in the range image by a mapping process; and
    a displaced substrate result that is sent to an output device when a displacement determination process compares the height information of a first feature of the substrate to height information of a second feature of the substrate and compares the height information of the first feature of the substrate to height information of the surrounding object and determines that a displaced substrate is present and determines an orientation of the displaced substrate with respect to the object,
    wherein the orientation of the displaced substrate with respect to the object comprises at least one of:
    (a) partially displaced out of the object; and
    (b) completely displaced out of the object.

2. The system as set forth in claim 1 further comprising a positioning process that locates features in the object based upon at least one vision system tool.

3. The system as set forth in claim 2 wherein the vision system tool comprises an edge-finding tool.

4. The system as set forth in claim 1 wherein the displacement determination process includes an interpretation process that generates height information for portions of the map that omit accurate height information.

5. The system as set forth in claim 4 wherein at least some of the portions of the map that omit accurate height information result from specularity on at least one of the object and the substrate.

6. The system as set forth in claim 1 wherein the range image is generated from an intensity image in which intensity values respectively correspond to predetermined ranges of height on the object.

7. The system as set forth in claim 6 wherein the intensity image is one of a plurality of grayscale intensity images each from a set of line images of the object as it moves relative to the field of view.

8. The system as set forth in claim 1 wherein the mapping process is constructed and arranged to compute and average height information for pixel locations based upon pixel values of adjacent pixel locations in the map.

9. The system as set forth in claim 8 wherein the mapping process is further constructed and arranged to fill in a portion having missing height information based upon averaging height data from areas surrounding the portion having missing height information.

10. The system as set forth in claim 1 wherein the object defines a carrier tray and the substrate is located within a well in the carrier tray.

11. The system as set forth in claim 10 further comprising a registration process that locates at least one fiducial on the carrier tray and that thereby locates an expected position of the well.

12. A method for determining displacement of a substrate with respect to a surrounding object with a vision system during movement of the object relative to a field of view, the method comprising the steps of:

projecting a laser line along the substrate, and receiving reflected light from the laser line to generate a range image having height information with respect to the object and the substrate;

generating a 2-dimensional (2D) map generated from the height information in the range image by a mapping process; and comparing the height information of a first feature of the substrate to height information of a second feature of the substrate and comparing the height information of the first feature of the substrate to height information of the surrounding object to determine whether a displaced substrate is present and determine an orientation of the displaced substrate with respect to the object, wherein the orientation of the displaced substrate with respect to the object comprises at least one of:

(a) partially displaced out of the object; and (b) completely displaced out of the object.

13. The method as set forth in claim 12 further comprising the step of locating features in the object based upon at least one vision system tool, the vision system tool comprising an edge-finding tool.

14. The method as set forth in claim 12 further comprising the step of generating height information for portions of the map that omit accurate height information by averaging height data from areas surrounding the portions of the map that omit accurate height information.

15. The method as set forth in claim 12 further comprising the steps of:

generating a plurality of grayscale images from a set of line images of the object as it moves relative to the field of view;

varying the projected laser line in height due to an associated height of the object;

storing pixel locations for each respective line at each pixel column of the image sensor; and normalizing height differentials into pixel intensity values for each row to define the range image.

16. The system of claim 1, wherein the first feature comprises a first corner of the substrate and the second feature comprises a second corner of the substrate.

17. The method of claim 12, wherein the first feature comprises a first corner of the substrate and the second feature comprises a second corner of the substrate.

* * * * *